Dec. 14, 1971          J. R. WHEELER          3,626,636
THERMAL PLANT CONDITIONING APPARATUS AND METHOD
Filed July 15, 1969                    4 Sheets-Sheet 2
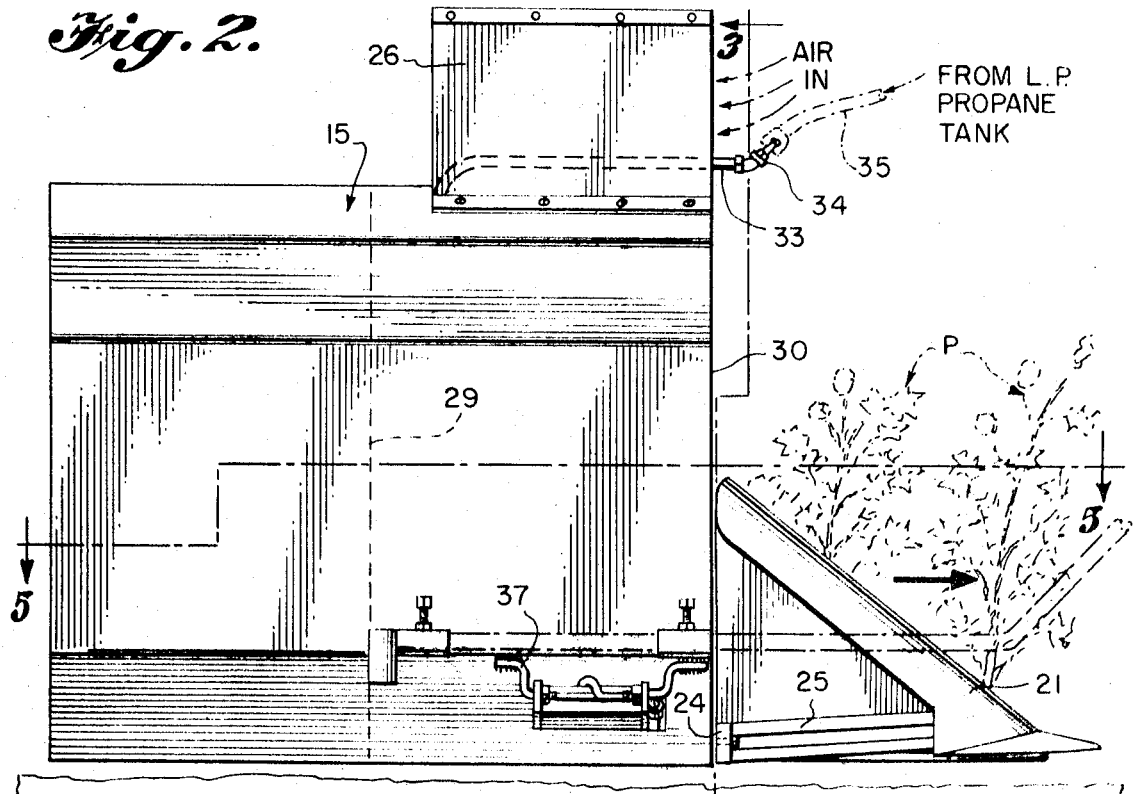
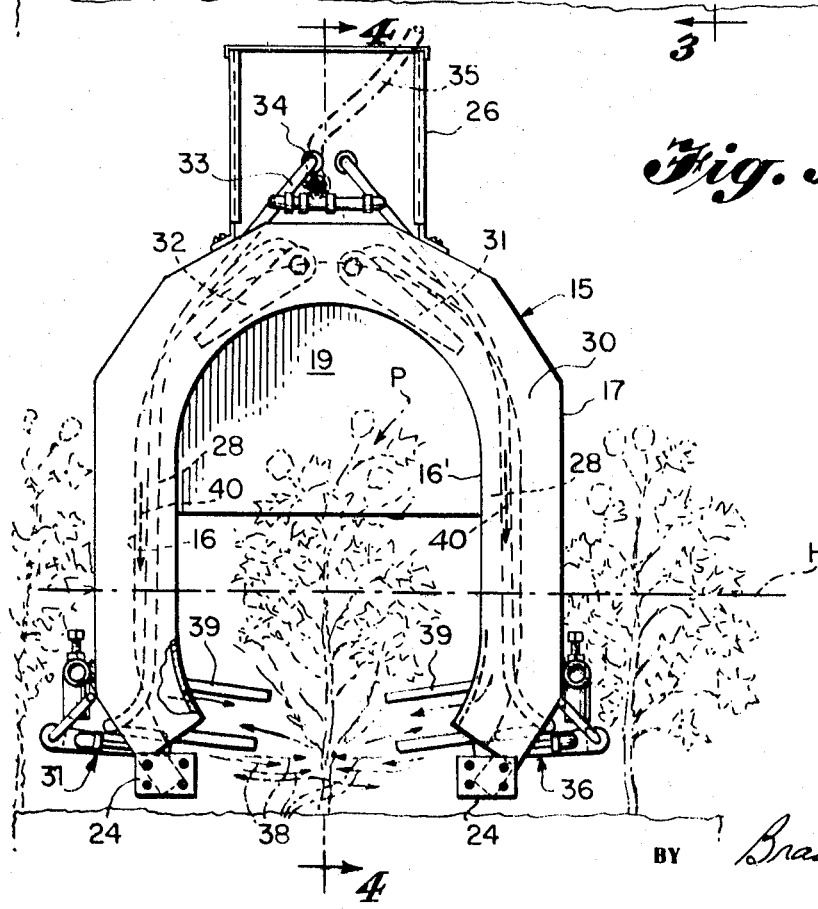
INVENTOR
JOE R. WHEELER
BY Brady, O'Boyle & Gates
ATTORNEYS

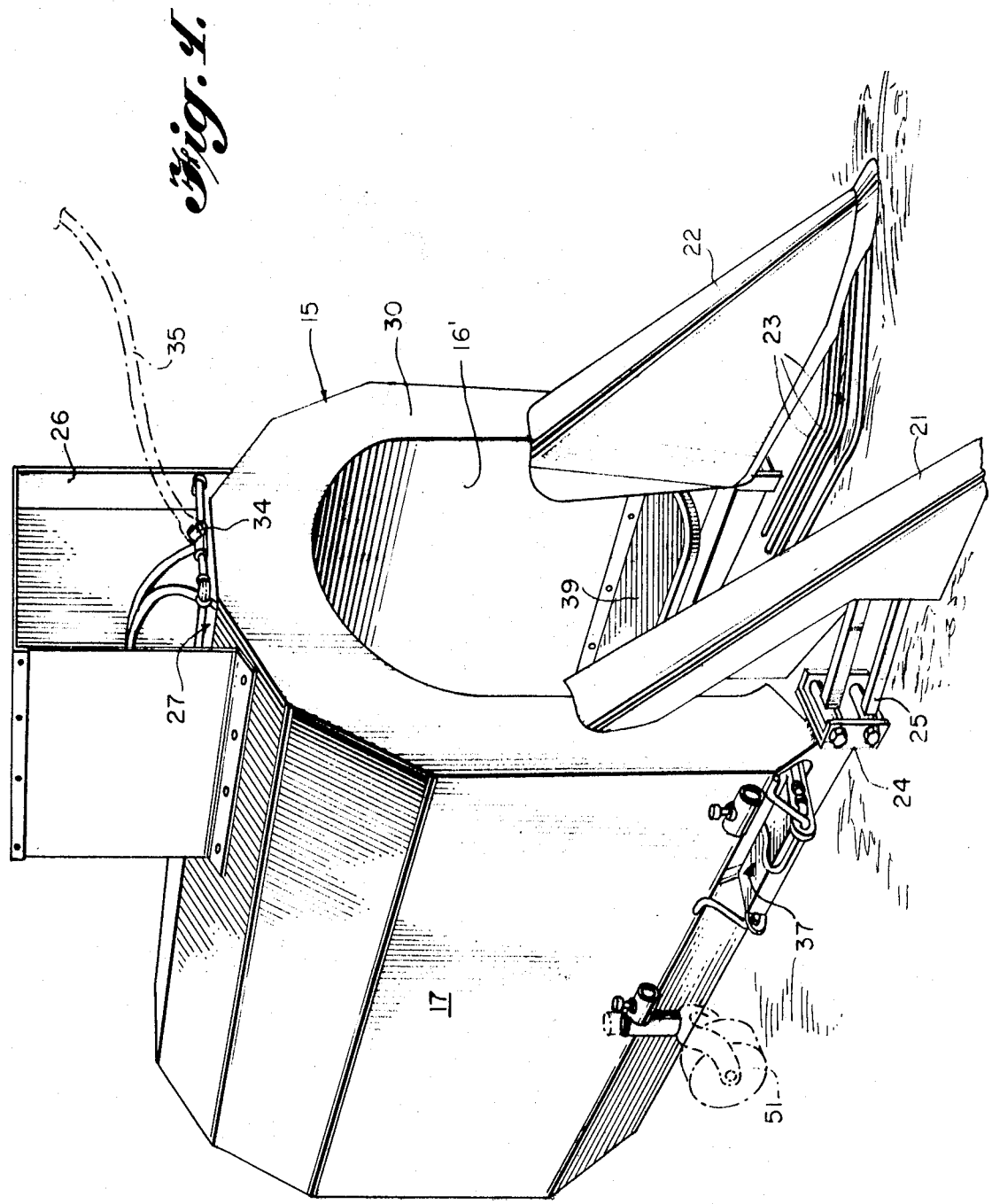

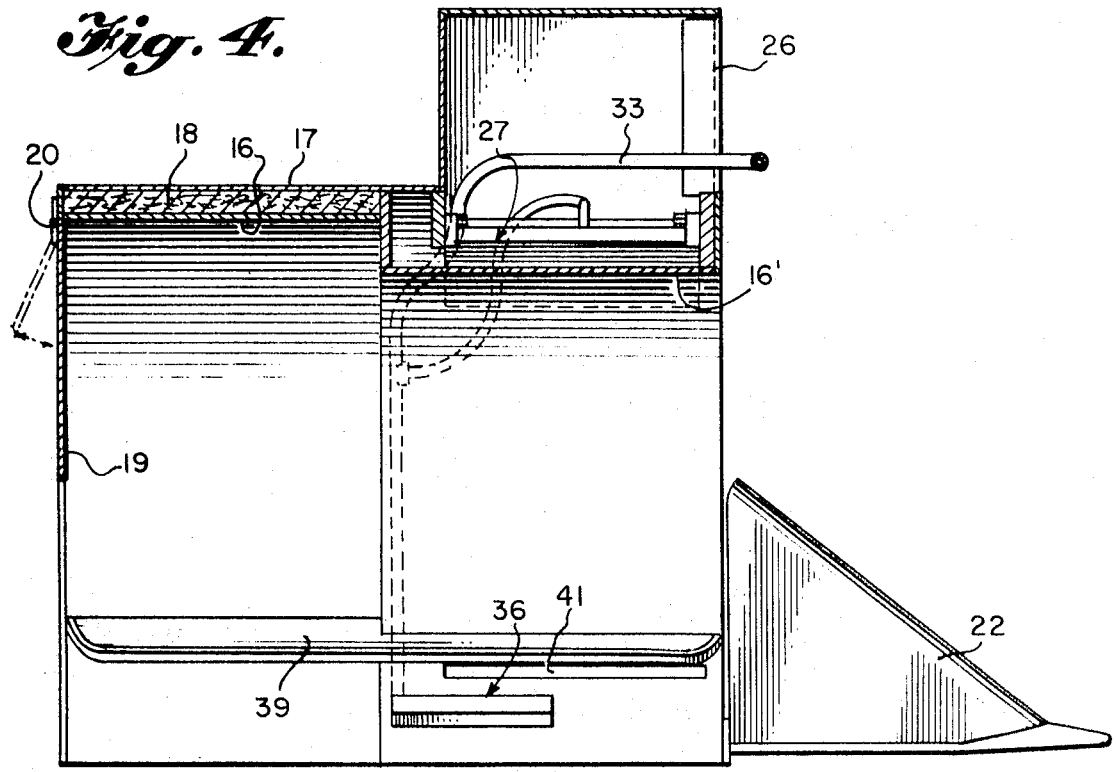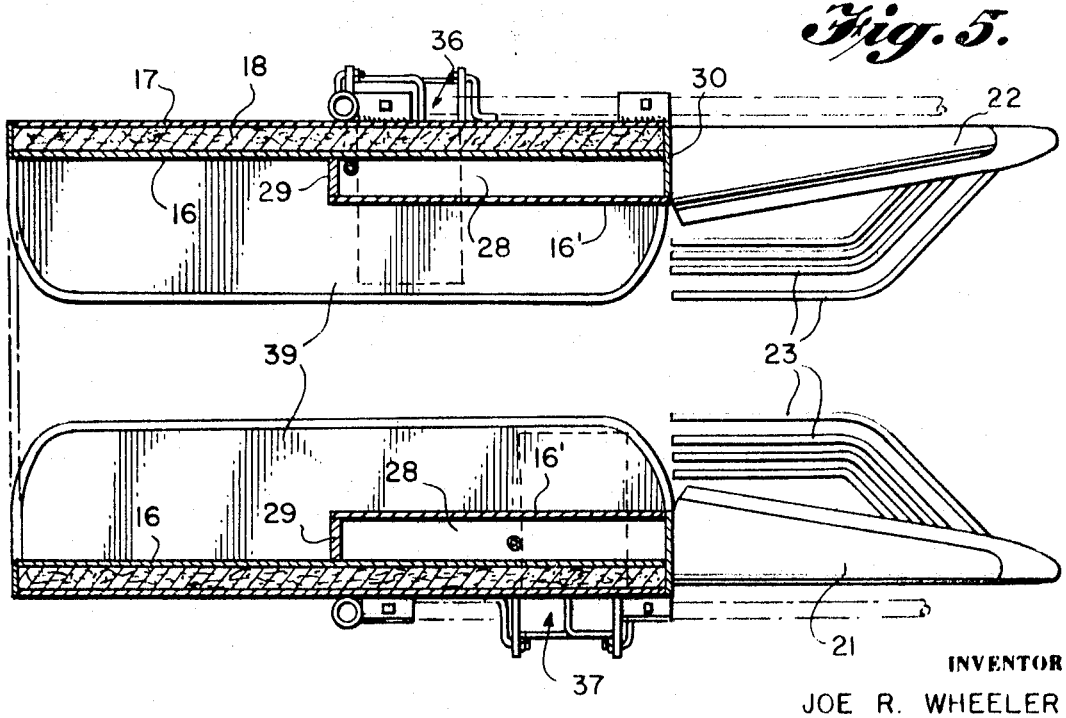

Dec. 14, 1971   J. R. WHEELER   3,626,636
THERMAL PLANT CONDITIONING APPARATUS AND METHOD
Filed July 15, 1969   4 Sheets-Sheet 4

INVENTOR
JOE R. WHEELER

BY Brady, O'Boyle & Gates
ATTORNEYS

United States Patent Office 3,626,636
Patented Dec. 14, 1971

3,626,636
THERMAL PLANT CONDITIONING APPARATUS AND METHOD
Joe R. Wheeler, Leachville, Ark. 72438
Filed July 15, 1969, Ser. No. 841,780
Int. Cl. A01m 15/00
U.S. Cl. 47—5      18 Claims

ABSTRACT OF THE DISCLOSURE

A mobile oven traverses rows of cotton plants or the like and forms a heating tunnel through which the plants pass. A lower set of laterally opposed burners subject the lower portions of the plants to flame primarily for shocking the plants. Alternatively, an upper set of burners within the hollow wall structure of the oven produce heat without direct flame action for less drastic forms of heat treatment.

---

A number of prior art devices are known for the thermal treatment of various plants and crops including flame clutivators, weeders and defoliation apparatus employing heat. These devices have met with varying degrees of success for their intended purposes but a definite need exists for an agricultural thermal treatment apparatus and method which is more versatile and capable of providing certain specialized plant treatments to produce shocking of plants, defoliation in a controlled manner, advanced maturing of cotton bolls and the like.

In accordance with the invention, a tunnel-like thermal treatment oven is provided adapted to be drawn by a tractor and utilizing low pressure propane gas as a heating fuel, the source of which gas may be on the towing vehicle. The oven has a hollow wall which is thermally insulated at its outer surface. A primary pair of burners is located in opposed relation at the bottom of the oven and near its leading end to provide direct flame treatment for the lower reaches only of plants passing through the oven. Cooperating flame baffles control the action of the flame and prevent it from rising to the upper reaches of the plants.

A second or auxiliary pair of burners is mounted within the hollow wall structure near the top thereof to direct heat downwardly within oven side wall passages and discharge this heat onto the plants from opposite sides thereof. This auxiliary source of heat does not subject the plants to the direct action of flame, as do the lower burners. Ordinarily, the two sets of burners are not employed simultaneously, as will be described. The invention apparatus has a number of additional features and advantages which will become apparent during the course of the following detailed description.

While the invention apparatus and method are primarily concerned with the conditioning and treatment of cotton, nevertheless the invention will be found useful for thermally treating various types of plants. For example, the conditioner may be used to dry out such crops as milo, corn, beans and to desiccate potato vines and sugar beets, so as to facilitate mechanical harvesting of these crops. It may also be used as a pre-emergence treatment to clean the row and drill area of any weeds or grasses. Another use of the invention is in the control of insects, such as the alfalfa weevil, by destroying the eggs and larvae of insects such as this.

With respect to the conditioning of cotton plants, cotton leaves supply carbohydrate nutrients to the developing and maturing bolls. The leaves also supply a harmonal substance, such as abscisic acid, which may be essential to the full maturation and opening of the bolls. While cotton leaves are green and lush, there is within the leaf the growth hormone, auxin. This blocks the action of abscisic acid. With the deterioration of the leaf, the growth hormone, auxin, is reduced and the content of abscisic acid is increased. From the standpoint of a harvest-aid practice, a two-phase process is apparent in defoliation. (1) Sufficient injury to initiate the process and (2) processes that lead to leaf separation or abscission.

The crop conditioner apparatus and method applies a thermal treatment to plants to produce an artificial environment conducive to the start of the maturation process. When heat is applied to the plant, it injures the cells in the leaf without damage to the leaf rib or petiole. With just enough damage to the leaf, auxin is reduced and abscisic acid becomes dominant. After abscisic acid becomes dominant, cells align themselves at the base of the leaf stem and the leaves begin to fall from the plant. The shocking of the plants by the direct action of flame is the only process known which will force the cotton plant to an earlier maturity. By shocking the plant with heat and causing the cotton to defoliate earlier, or by increasing the heat and desiccating the cotton, the farmer can control the time of harvesting and be less dependent upon weather conditions.

The present invention will be seen to differ markedly from the prior art in that no heat or flame is directed downwardly on top of the plants or crops or even on the sides of the plants except at the bottoms thereof near the ground level. It has been customary in the prior art to direct heat on the plants from above or from the sides in the upper reaches of the plants either in the form of flame jets, hot air blasts or the like. In general, in the prior art, the thermal treatment of plants has been from top to bottom, whereas with the invention a controlled thermal treatment from bottom to top is carried out.

With the invention method, a heat level may be established and maintained or adjusted to any height with respect to the plants. For example, the heat level may be approximately halfway up the height of cotton plants in a row so as to subject the lower approximately one-half of each plant to heat treatment without materially effecting the upper portions of the plants. This will advance the maturing and opening of cotton bolls on the lower portions of the plants first and then subsequently a further heat treatment of the upper plant portions can be employed to advance the maturing of bolls in those regions. The adjustment of the heat level can be accomplished by changing a number of variables. First, the speed of the machine traveling down the rows and hence the time during which the plants receive heat near their bottoms may be adjusted. Secondly, the burner nozzle orifice size may be adjusted or changed, and thirdly, the fuel pressure feeding the nozzles may be adjusted.

In very wet weather, the cotton plants will be green and lush and the leaf growth or foliage is rapid and the maturing of the bolls, if left to nature, may be retarded. Under such conditions, the bottoms of the plants will be subjected to a shock-type heat treatment by the direct action of flame, to be fully described. This will alter the cell structure of leaves over the lower half of the plant, causing subsequent defoliation, and will rapidly mature the bolls in the same region. In drier weather, it may be desirable to eliminate the flame shock treatment and utilize the more remote upper burners which create heat currents down the opposite side passages of the oven. This heat is also directed to the opposite sides of the plants near their bottoms but is not a direct flame treatment and in effect a hot air treatment which is less drastic. Again, depending upon the speed of the oven, the action of the heat deflectors and other variables, the heat may be allowed to rise to a pre-selected level.

By proper heat treatment in accordance with the invention method and apparatus, it is thought that the yield of cotton acreage will be substantially increased and the crop can be harvested sooner and with greater efficiency and without rot and deterioration of the bolls.

As already suggested, the invention has additional application beyond cotton although it is particularly useful in treating cotton to defoliate the plants progressively from bottom to top and allowing picking of the lower regions while the plant tops remain green and continue growing to nourish the bolls. If frost should appear likely, a farmer may use the invention to give any crop a light heat treatment. In the case of cotton, this will dry the bolls and lessen the likelihood of damage from frost.

The apparatus is readily adaptable to conventional flame cultivator equipment or to the usual High-Boy unit which most farmers possess. In any case, all that is necessary is a suitable tool bar for connecting the apparatus to a tractor draft system.

BRIEF DESCRIPTION OF DRAWING FIGURES

FIG. 1 is a perspective view of a thermal conditioning apparatus for plants or crops embodying the invention.

FIG. 2 is a side elevation of the same.

FIG. 3 is a front elevational view of the apparatus.

FIG. 4 is a central vertical longitudinal section taken on line 4—4 of FIG. 3.

FIG. 5 is a horizontal section taken on line 5—5 of FIG. 2.

DETAILED DESCRIPTION OF PREFERRED EMBODIMENT

Figure 6:
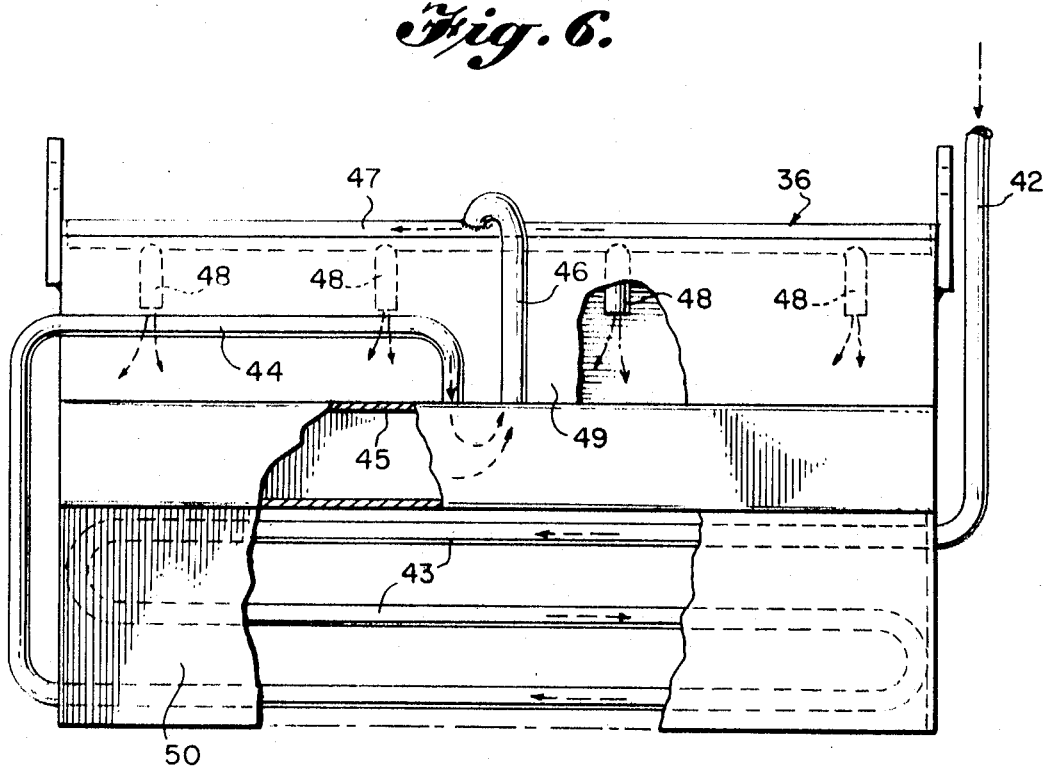
FIG. 6 is a plan view of a burner unit, partly in section.

Referring to the drawings in detail wherein like numerals designate like parts throughout the same, the numeral 15 designates generally a body portion or oven which is inverted U-shaped, somewhat elongated and open at the bottom, as shown. The oven forms a heat tunnel through which standing plants in a row, such as cotton plants, move as the conditioning apparatus is drawn along a row by a tractor or the like. The oven 15 comprises inner and outer spaced walls 16 and 17, and the intervening space therebetween is filled with a suitable heat insulating material 18. The forward and rear ends of the oven are basically open, but a normally vertical heat-retaining baffle 19 is hinged at 20 to the top of the oven adjacent its rear end, tending to trap and retain heat within the oven during forward movement along a row of cotton or other plants being treated. The baffle 19 is free to swing rearwardly upon contact with the plants and will not damage the plants or obstruct the forward movement of the apparatus.

The forward end of the oven is equipped on opposite sides with substantially conventional foliage lifting and deflecting fenders 21 and 22 having inwardly and rearwardly projecting tines 23 at their bottoms which ride close to the ground. A passageway for plants is provided between the fenders and tines, as clearly shown in FIG. 5. The fenders are attached to sturdy mounting pads 24 on the forward end of the oven at its bottom. The attaching means 25 may be of any conventional form.

Atop the oven 15 at its forward end is a large air inlet hood or scoop 26 which is forwardly open and closed at its top, rear end and opposite sides. A large air inlet opening 27 leads from the bottom of the hood or scoop 26 through the exterior wall 17 of the oven at the top of the oven. From the region of the air scoop 26 forwardly, the interior wall of the oven is offset inwardly as shown at 16' and this offset portion forms with the outer wall 17 two descending hot air passages 28 on opposite sides of the oven leading to the lower end thereof. The rear sides of these descending passages 28 are closed by partitions 29 and the forward sides of the passages are closed by the complete oven front wall 30.

Disposed within the tops of the passages 28 substantially under the scoop 26 in inclined diverging relation are secondary gaseous fuel burners 31 and 32 whose details will be described. The nozzles of these two burners are fed with low pressure propane gas through an inlet line 33 coupled at 34, FIG. 2, with a hose 35 leading from a tank on the towing tractor or like vehicle, not shown. The two burners 31 and 32 are supported upon the oven in the positions shown by any conventional means. These secondary burners are arranged to direct heat downwardly through the vertical side passages 28, as will be further discussed.

Primary flame burners 36 and 37, substantially identical to the burners 31 and 32, are mounted generally horizontally at the bottom of the oven in opposed relation on opposite sides thereof and adjacent to its forward end, and are staggered relative to each other longitudinally of the oven, FIG. 5. The burner nozzles, to be described, are disposed to project jets of flame substantially horizontally inwardly transversely across the oven to the opposite wall, only slightly above ground level and toward the bottoms of cotton plants P passing through the moving oven. The elevation and direction of the opposing flame jets from the primary burners 36 and 37 is indicated by the arrows 38 in FIG. 3. Since the opposite burners are staggered longitudinally of the oven with no overlap, the flames transversing the bottom of the oven from one wall to the opposite wall do not interfere with each other. It is important that the burners are staggered, otherwise the flames from opposite burners meet at the plant stalk and deflect each other up the stalk to the top part of the plant, contrary to operation of the invention. With the transverse flames longitudinaldly offset the flames do not have a tendency to climb the plant stalks. As will be further explained, these jets of flames are employed primarily during a wet season for shock treatment of the plants to inhibit the growth of foliage and advance the maturity of the cotton bolls, as well as to defoliate the lower portions of the plants. The opposing flame jets project completely across the bottom of the oven between the interior walls 16'.

Slightly above the primary burners 36 and 37, generally horizontal flame baffles 39 are rigidly secured to the interior side walls of the oven and extend longitudinally thereof throughout the full length of the oven. Again, a sufficient space is provided between the inner opposed edges of the baffles 39 to allow easy passage of the plants P through the oven. The flame jets projected by the burners 36 and 37 pass across the oven and are caught under the baffles 39 on the respective opposite sides of the oven and these baffles prevent the flames from passing upwardly along the oven side walls 16' and contacting the sides of the plants where flame treatment is not desired. The flame treatment is thus confined by the baffles 39 to the lowermost portions of the plants, as shown clearly in FIG. 3.

The auxiliary or secondary burners 31 and 32 direct flame downwardly in the heat passages 28, as stated, but the actual flame jets from the burners 31 and 32 do not extend close to the bottom of the oven and hot air only, without flame, descends through the passages, as shown by the arrows 40, and discharges inwardly through suitable slots 41, preferably below the baffles 39, although not necessarily so. When the burners 31 and 32 are employed, a gentler form of heat involving hot air drawn in through the scoop 26 is directed inwardly toward opposite sides of the plants P and is free to circulate upwardly within the interior of the oven by convection. Such heating without flame is generally employed in a dry season merely for defoliation purposes when mature cotton bolls are present near the bottoms of the plants. In such circumstances, the use of flame on the plants near their bottoms would destroy the maturing bolls and hence is not used. Ordinarily, the burners 31 and 32 and 36 and 37 are not used simultaneously. That is to say, one type of heat treatment is employed in situations where the other type is not desirable.

Figure 7:
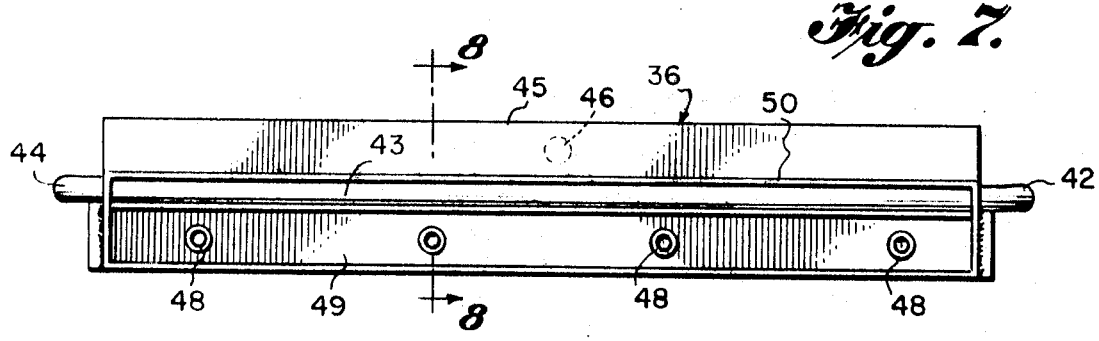
FIG. 7 is a side elevation of the same.
Figure 8:
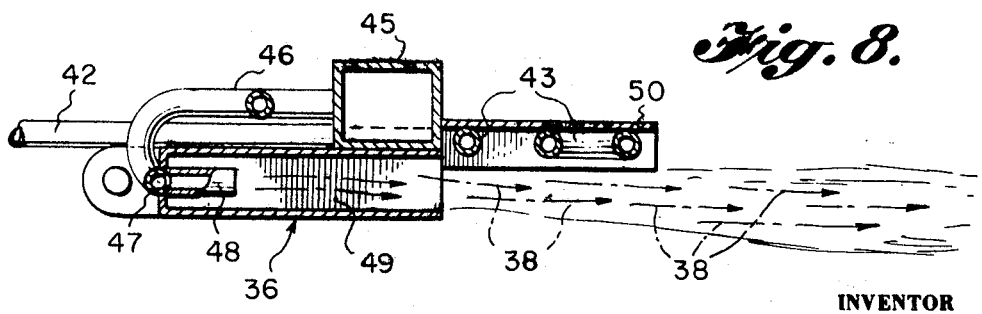
FIG. 8 is a transverse vertical section taken on line 8—8 of FIG. 7.

FIGS. 6, 7 and 8 show the details of a typical burner employed in the apparatus. For the purpose of illustration, one of the primary burners 36 is shown. Each such burner comprises a fuel inlet pipe 42 leading directly to a zigzag vaporizer coil 43, in turn connecting with a fuel pipe 44 leading into a vaporizing header 45. A supply or outlet pipe 46 leads out from the center of the header 45 to convey vaporized fuel to an underlying branch pipe 47 which supplies fuel to preferably four parallel flame nozzles 48 arranged in laterally spaced relation. As shown in FIG. 8, the nozzles 48 are enclosed within a box-like housing 49 beneath the header 45. Other forms of burner structure may be employed in the apparatus, if preferred, although the presently-described burner is ideal due to its compactness and flat configuration depicted in FIGS. 6 through 8. Flame emanates from each separate burner nozzle 48 when fuel is being supplied and ignition takes place. The vaporizing coils 43 are also covered by a hood-like protector 50, as shown.

The same hose 35 previously described coupled with the pipe 33 supplies gaseous fuel to all four of the burners 31, 32, 36 and 37, and the piping interconnecting these burners is entirely conventional and need not be described in detail herein.

While the specific draft means for the apparatus connecting it with a tractor or the like are omitted for simplicity, it is to be understood that the apparatus or oven is well adapted for connection with a conventional flame cultivator or a Hi-Boy unit. If these units are not available, a suitable tool bar is provided to connect the oven with a towing tractor. The oven 15 is preferably equipped at its opposite sides with ground wheels 51 although, if preferred, the oven may run on skids or be totally supported by the tractor implement lift.

SUMMARY OF OPERATION

In view of the preceding description, it is believed that the operation of the apparatus in the practice of the method has essentially been made clear. However, to summarize, the oven 15 is drawn along a row of cotton plants or the like which pass in succession through the tunnel-like heating passage, FIG. 3. The intensity of heat and the approximate effective heat level designated H in FIG. 3 may be maintained or regulated in several ways. The speed of the apparatus along the row is a variable as is burner nozzle orifice size and fuel pressure, as already mentioned. When it is desired to shock treat the plants to cause defoliation initially over about the bottom one-half of each plant with a corresponding accelerated maturing of bolls in this region, the bottoms of the plants are subjected to a direct flame treatment from the nozzles 48. The flames pass inwardly near and above the ground and actually project themselves entirely across the oven in opposite directions below the deflectors 39 and these deflectors prevent the flame from curling or rising up the sides of the plants.

When a gentler heat treatment is desired, the lower burners 36 and 37 are turned off and the upper burners 31 and 32 are used alone. Heat without flame from the burners 31 and 32 will be emitted through the slots 41 from the passages 28 on the opposite sides of the oven and again this heat is directed toward the opposite sides of the plants near their bottoms. It has already been pointed out that under some weather conditions a flame treatment is desirable while at other times the gentler hot air treatment is needed. Thus, with the method and apparatus, the plants may actually be provided with a variety of types of heat treatment varying from a rather violent flame shock treatment to a light warming, again by making use of the apparatus variables. The process differs and run counter to the prior art in that the cotton or the like is thermally treated from the bottom up and not from the top down. It is thought that the various features and advantages of the invention will now be understood by those skilled in the art without the necessity for any further description herein.

What is claimed is:

1. A thermal plant treatment method comprising the steps of directing flame generally horizontally toward opposite sides of standing plants close to the ground and near the very bottoms of the plants from points spaced laterally from opposite sides of the plant, simultaneously confining the plants in an enclosure above and on opposite sides thereof, projecting the opposing flames substantially entirely across the enclosure beyond the plants and in opposite directions without interfering with each other, deflecting the projected flames downwardly at the opposite sides of the enclosure and preventing them from rising along the opposite sides of the plants toward the tops thereof, and continuously moving the opposing flames and plant enclosure along a row of standing plants during the flame treatment of the bottoms of the plants.

2. The thermal plant treatment method of claim 1 and providing a concentration of heat from the ground to a desired preselected height on the plants for thermally treating that portion only of the plants between the ground and said desired preselected height.

3. The method as defined by claim 1, and said opposing flames on opposite sides of the plants consisting of a plurality of spaced approximately horizontal jets of flame under pressure, said flames spaced lengthwise of the plants in a row and staggered relative to each other.

4. A thermal plant treatment method comprising directing opposed streams of heat toward opposite sides of plants in a row close to the ground and the bottoms of the plants and generally horizontally, simultaneously at least partially confining said directed heat near the bottoms of the plants to establish and maintain a heat level from the ground upwardly for treating the plants at a desired predetermined elevation with relation to plant height, whereby lower portions to desired selected height only of the plants are subjected to the heat treatment, and moving the heat directing and confining means lengthwise of the plant row at a selected speed while directing the streams of heat toward opposite sides of plants to adjust the treatment heat level.

5. The method as defined in claim 4, and varying the speed of movement of the heat directing and confining means along the row to adjust the level of heat for treatment with respect to plant height whereby top portions of the plants may be left uneffected while the bottom portions to a desired height are affected by the heat treatment.

6. Apparatus for the thermal treatment of standing plants in rows comprising a tunnel-like oven adapted to straddle a row of plants and to move along the row so as to enclose the sides and top of the plants within the oven during movement of the oven, laterally opposed burners on the oven near the bottom thereof and relatively close to the ground and near the bottoms of the plants and adapted to project opposing flames substantially across the bottom of the oven and the bottom portions of the plants to thereby subject the plants to a shock treatment, and laterally opposed generally horizontal flame deflectors carried by the opposite side walls of the oven and projecting inwardly thereof in overlying relation to said burners and to the opposing flames to prevent the flames from traveling upwardly along the sides of the plants and confining the flame treatment to the bottoms of the plants, and said flame deflectors having free edges in lateral spaced relation defining a passage for plants through the oven.

7. The structure of claim 6, and said oven having hollow side walls defining generally vertical heating passages, said side walls having outlet openings near their lower ends, and auxiliary burners on the top portion of the oven substantially above the tops of the plants and adapted to direct flames downwardly within said passages to produce heat therein and said heat emanating through the discharge openings on opposite sides of the plants.

8. The structure of claim 7, and air inlet means on the top of the oven to support combustion within said passages.

9. The structure of claim 8, and said air inlet means comprises an opening in the top of the oven communicating with said passages and a forwardly open air scoop mounted on the top of the oven above said opening.

10. The structure of claim 7, and said tunnel-like oven being approximately inverted U-shaped and open at its bottom and forward and rear ends, said hollow side walls consisting of inner and outer spaced walls, and thermal insulating material between said spaced walls to prevent loss of heat outwardly of the oven, said vertical heating passages disposed inwardly of said insulation.

11. The structure of claim 10, and said burners and vertical heating passages disposed near the forward end of the oven and the remainder of the oven extending for a substantial distance rearwardly of the burners and passages.

12. The structure of claim 11, and a hinged heat retaining baffle depending from the top of the oven adjacent the rear open end thereof.

13. The structure of claim 6, and said burners each being generally horizontally disposed and shallow in configuration and each having a fuel vaporizing coil and header and a plurality of laterally spaced generally horizontal burner nozzles directed toward one side of the plants near the bottoms thereof and beneath the flame deflectors.

14. The structure of claim 13, and said generally horizontal flame deflectors consisting of a pair of baffle plates on the interior side walls of the oven extending substantially for the full length of the oven from front-to-back.

15. The structure of claim 14, and sloping foliage deflector fenders on the front of the oven having a passageway for plants therebetween.

16. The structure of claim 15, and at least one ground-engaging wheel on each side of the oven.

17. The structure of claim 6 in which said laterally opposed burners are staggered longitudinally of said oven.

18. Apparatus for the thermal treatment of standing plants in rows comprising a tunnel-like oven adapted to straddle a row of plants and to move along the row so as to enclose the sides and top of the plants within the oven during movement of the oven, hollow side walls in said oven defining generally vertical heating passages, air inlet means on the top of the oven in communication with said passages, said side walls having laterally opposed outlet openings near their lower ends and relatively close to the ground near the bottoms of the plants, burners on the top portion of the oven substantially above the tops of the plants and adapted to direct flames downwardly within said passages to produce heat therein and said heat emanating through the discharge openings and adapted to project across the bottom of said oven on opposite sides of and to the bottom portions of the plants.

References Cited
UNITED STATES PATENTS

| | | | |
|---|---|---|---|
| 2,531,741 | 11/1950 | Peck | 47—1.44 |
| 2,899,776 | 8/1959 | Arnold | 47—1.44 |
| 1,341,672 | 6/1920 | Rector | 126—271.2 |
| 2,531,884 | 11/1950 | McLemore | 126—271.2 C |
| 2,682,728 | 7/1954 | Nisbet et al. | 126—271.2 A X |
| 2,882,889 | 4/1959 | Shiplet | 126—271.2 |
| 3,442,262 | 5/1969 | Porterfield et al. | 126—271.2 |
| 3,477,174 | 11/1969 | Lalor | 126—271.2 X |

CHARLES J. MYHRE, Primary Examiner

U.S. Cl. X.R.

47—1.44; 126—271.2 A